United States Patent

Barrett et al.

[11] Patent Number: 6,015,093
[45] Date of Patent: *Jan. 18, 2000

[54] TRANSFER DEVICE FOR TRANSFERRING DATA BETWEEN AN ELECTRONIC DATA PROCESSING DEVICE AND A CARD

[75] Inventors: Paul Barrett, Worcester Park, United Kingdom; Raymund Eisele, Idstein, Germany

[73] Assignee: Smartdiskette GmbH, Idstein, Germany

[*] Notice: This patent is subject to a terminal disclaimer.

[21] Appl. No.: 09/339,680

[22] Filed: Jun. 24, 1999

Related U.S. Application Data

[62] Continuation of application No. 08/514,382, Aug. 11, 1995, which is a continuation-in-part of application No. 08/170,166, filed as application No. PCT/EP92/01356, Jun. 16, 1992, Pat. No. 5,584,043.

[30] Foreign Application Priority Data

Jun. 26, 1991 [DE] Germany ................. 4121023

[51] Int. Cl.⁷ ............................................. G06K 5/00
[52] U.S. Cl. .................................... 235/492; 235/486
[58] Field of Search ........................ 235/487, 492, 235/486, 475, 375

[56] References Cited

U.S. PATENT DOCUMENTS

| | | |
|---|---|---|
| 3,700,826 | 10/1972 | O'Neal . |
| 3,940,758 | 2/1976 | Margolin . |
| 3,946,156 | 3/1976 | Budrose . |

(List continued on next page.)

FOREIGN PATENT DOCUMENTS

| | | |
|---|---|---|
| 0 178 805 | 4/1986 | European Pat. Off. . |
| 0 328 124 | 8/1989 | European Pat. Off. . |
| 0 373 411 | 6/1990 | European Pat. Off. . |
| 35 34 638 | 5/1986 | Germany . |
| 35 28 199 | 2/1987 | Germany . |
| 37 01 114 | 8/1987 | Germany . |
| 87 09 268 | 10/1987 | Germany . |
| 39 03 454 | 6/1990 | Germany . |
| 40 36 336 | 5/1992 | Germany . |

(List continued on next page.)

OTHER PUBLICATIONS

IBM Technical Disclosure Bulletin, "Personal Transaction Card", vol. 30, No. 3, Aug. 1987, pp. 1262–1265.

IBM Technical Disclosure Bulletin, "Transaction Handling System Using a Bank Card with Display, Input and Memory Functions", vol. 28, No. 6, Nov. 1985, pp. 2568–2570.

IBM Technical Disclosure Bulletin, "Stiffened Card With Integrated Circuit", vol. 28, No. 11, Apr. 1986, pp. 4723–4725.

"IC–Cards–neue Aspekte der Informationsverarbeitung", Dantentechnik, Electronik, 19/19.9. 1986, pp. 99–101.

*Primary Examiner*—Donald Hajec
*Assistant Examiner*—Mark Tremblay
*Attorney, Agent, or Firm*—Nixon & Vanderhye P.C.

[57] ABSTRACT

A pocket interface unit for a smart diskette. The smart diskette has a housing of the shape and size of a standard diskette, electrical contacts and/or a magnetic transducer, an activation switch, and further has an interface, a processor and memory disposed in the housing and operatively coupled to the electrical contacts/magnetic transducer. The interface unit includes a frame adapted to removably attach to the smart diskette housing, electrical contacts and/or magnetic transducer for engaging corresponding electrical contacts and/or magnetic transducer on the smart diskette, a switch operating mechanism for operating an activation switch on the smart diskette when the smart diskette is attached to the frame, a display operatively coupled to the electrical contacts and/or magnetic transducer, for displaying text and/or graphical data under control of the smart diskette, and a plurality of user actuatable keys, operatively coupled to the electrical contacts and/or magnetic transducer, for facilitating user input of data under the control of the smart diskette. The pocket interface unit thereby provides a user interface with the smart diskette.

21 Claims, 11 Drawing Sheets

U.S. PATENT DOCUMENTS

| | | |
|---|---|---|
| 3,978,524 | 8/1976 | Gordon et al. . |
| 4,034,164 | 7/1977 | Westmoland . |
| 4,228,474 | 10/1980 | Neal, Jr. . |
| 4,446,519 | 5/1984 | Thomas . |
| 4,504,871 | 3/1985 | Berwick et al. . |
| 4,575,621 | 3/1986 | Dreisfus . |
| 4,656,533 | 4/1987 | Sakai et al. . |
| 4,672,182 | 6/1987 | Hirokawa . |
| 4,701,601 | 10/1987 | Francini et al. . |
| 4,734,897 | 3/1988 | Schultz . |
| 4,755,883 | 7/1988 | Uehira . |
| 4,769,764 | 9/1988 | Levanon . |
| 4,774,618 | 9/1988 | Raviv . |
| 4,791,283 | 12/1988 | Burkhardt . |
| 4,814,924 | 3/1989 | Ozeki . |
| 4,860,128 | 8/1989 | Nakagawa . |
| 4,868,373 | 9/1989 | Opheij et al. . |
| 4,891,727 | 1/1990 | Sato et al. . |
| 4,935,962 | 6/1990 | Austin . |
| 4,951,249 | 8/1990 | McClung et al. . |
| 4,959,861 | 9/1990 | Howlette . |
| 4,963,691 | 10/1990 | Iftikar et al. . |
| 4,965,691 | 10/1990 | Iftikar et al. . |
| 5,015,830 | 5/1991 | Masuzawa et al. . |
| 5,044,798 | 9/1991 | Roylance et al. . |
| 5,050,020 | 9/1991 | Campbell et al. . |
| 5,055,947 | 10/1991 | Satch . |
| 5,068,894 | 11/1991 | Hoppe . |
| 5,159,182 | 10/1992 | Eisele . |
| 5,204,663 | 4/1993 | Lee . |
| 5,224,216 | 6/1993 | Gordon et al. . |
| 5,227,615 | 7/1993 | Oogita . |
| 5,237,551 | 8/1993 | Ogawa et al. . |
| 5,267,311 | 11/1993 | Bakhoum . |
| 5,276,317 | 1/1994 | Ozouf et al. . |
| 5,296,692 | 3/1994 | Shino . |
| 5,321,817 | 6/1994 | Feinstein . |
| 5,338,923 | 8/1994 | Grieu . |
| 5,406,064 | 4/1995 | Takahashi . |
| 5,423,054 | 6/1995 | Schmidt et al. . |
| 5,434,737 | 7/1995 | Miura . |
| 5,465,381 | 11/1995 | Schmidt et al. . |
| 5,471,038 | 11/1995 | Eisele et al. . |
| 5,473,765 | 12/1995 | Gibbons et al. . |
| 5,486,687 | 1/1996 | Le Roux . |
| 5,497,464 | 3/1996 | Yeh . |
| 5,541,985 | 7/1996 | Ishii et al. . |
| 5,550,709 | 8/1996 | Iwasaki . |
| 5,568,441 | 10/1996 | Sanemitsu . |
| 5,584,043 | 12/1996 | Burkart . |
| 5,771,143 | 6/1998 | Vernois ................................. 360/133 |

FOREIGN PATENT DOCUMENTS

| | | |
|---|---|---|
| 2-161670 | 6/1990 | Japan . |
| 3-30007 | 2/1991 | Japan . |
| 3-141486 | 6/1991 | Japan . |
| 3-194680 | 8/1991 | Japan . |
| 3-233790 | 10/1991 | Japan . |
| 4-205079 | 7/1992 | Japan . |
| 664 635 | 3/1988 | Switzerland . |
| WO 89/12288 | 12/1989 | WIPO . |

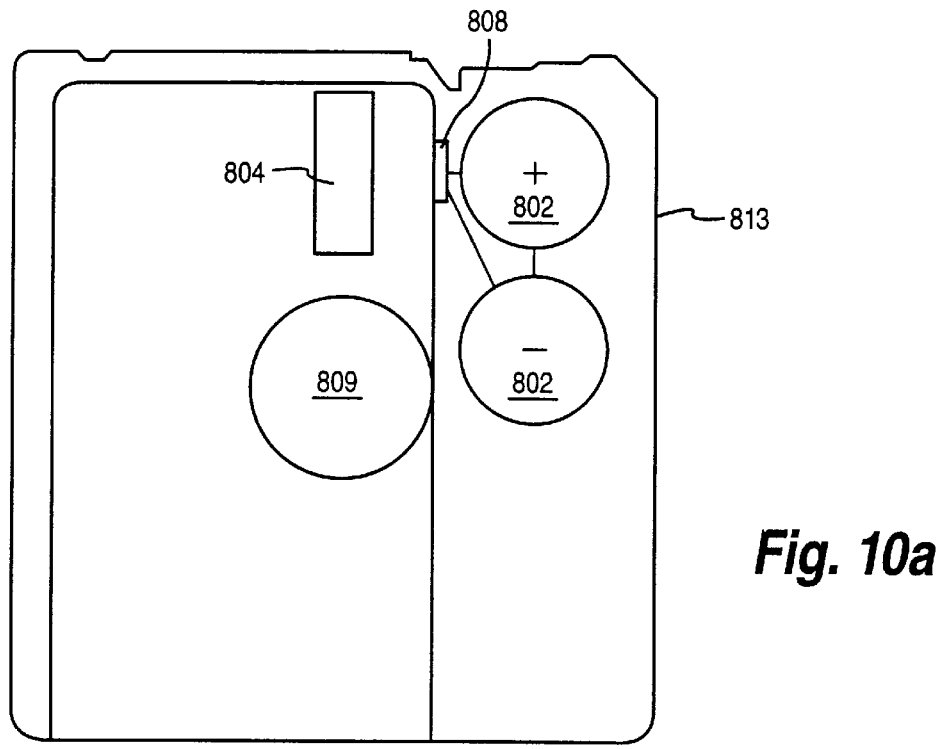
*Fig. 10a*
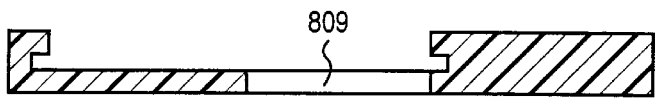
*Fig. 10b*
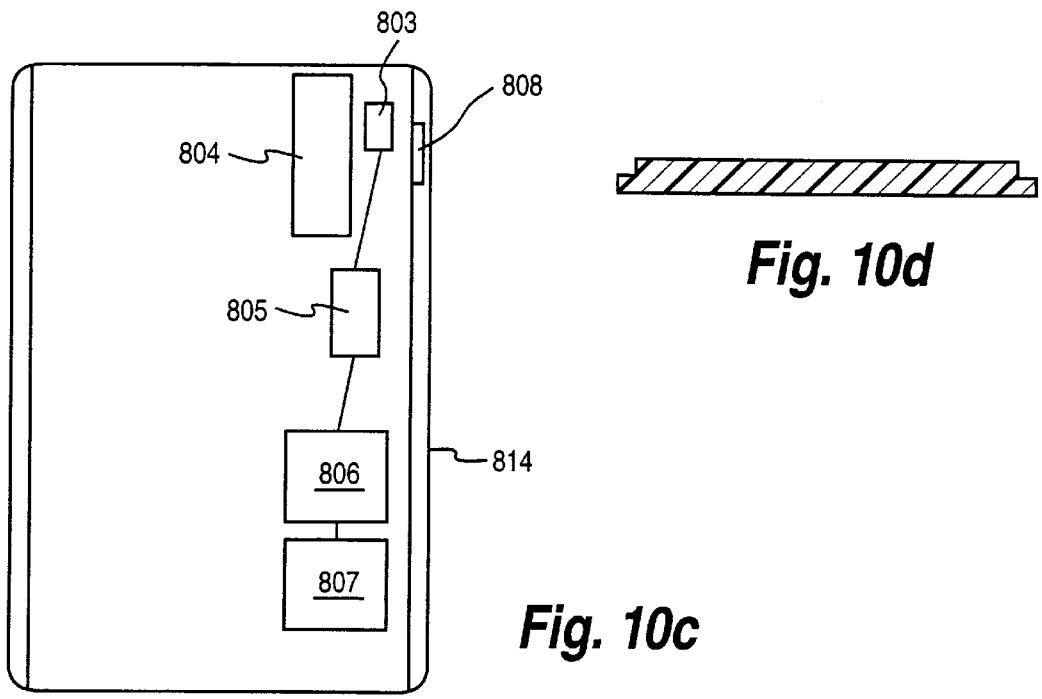
*Fig. 10d*
*Fig. 10c*

TRANSFER DEVICE FOR TRANSFERRING DATA BETWEEN AN ELECTRONIC DATA PROCESSING DEVICE AND A CARD

CROSS-REFERENCE TO RELATED APPLICATIONS

This is a continuation of allowed application Ser. No. 08/514,382, filed on Aug. 11, 1995 still pending, which is a continuation-in-part of application Ser. No. 08/170,166, filed Apr. 19, 1994, now U.S. Pat. No. 5,584,043 which is a 371 of PCT/EP92/01356, filed Jun. 16, 1992. Patent application Ser. No. 08/514,382 is hereby incorporated by reference.

This application is related to copending applications Ser. Nos. 08/420,796, 08/211,488, now U.S. Pat. No. 5,471,038, U.S. Ser. No. 07/712,897, now U.S. Pat. No. 5,457,590 and U.S. Ser. No. 08/479,747, the subject matter thereof being hereby incorporated by reference.

BACKGROUND OF THE INVENTION

1. Field of The Invention

The present invention relates generally to the field of computer user interfaces, and in particular to a pocket user interface (PIU) device which is adapted to accommodate and/or interface with a smart diskette.

2. Background Information

From the earlier German patent registration P 39 03 454 A1 a component (Smartdiskette) is known which can be inserted into an EDP installation. This component is designed as a diskette and equipped with a special interface. The interface is designed in such a manner that a data transfer can be performed between a processor located in the diskette and the EDP installation via the already existing read/write device. The particular advantages affiliated with this feature are based on the fact that data can be transferred between the processor of the diskette and the EDP installation without any additional interfaces being required. One characteristic of the interface section, the converter, is known from the German Patent registration P 40 36 336.83-53.

A smart diskette is a device having the external shape of, for example, a standard 3½" diskette, and which contains therein, instead of and/or in addition to a magnetic medium, interface and processing circuitry for providing particular functionality to the device.

The smart diskette circuitry includes an interface for transferring data between other components on the device and a magnetic head of a standard disk drive. In various forms, the smart-diskette device also includes a microprocessor for controlling the device and performing various tasks, such as data encryption, and memory, in the form of RAM (random access memory), ROM (read only memory), EEPROM (electronically erasable/programmable read only memory), and/or Flash memory devices, for storing programs and data.

U.S. Pat. No. 5,159,182, and copending application Ser. No. 08/420,796 (Atty Docket No. LWBR 0006C1), disclose a smart-diskette insertable element with magnetic interface, processor, power supply and optional display and keypad to be inserted into a standard 3½" floppy disk drive, for example, of a host computer, i.e., electronic data processing (EDP) equipment, such as a desk-top personal computer (PC) or notebook computer.

An exemplary embodiment of the smart-diskette insertable element disclosed in the above-mentioned patent and application, has a processor with a built-in memory and an interface designed in such a way that it is possible to exchange data between the element's processor and the EDP equipment's disk drive read/write head. A driver converts signals coming from the element's processor into the required magnetic form at the interface, and converts signals coming from the external EDP equipment through the interface into the required form for the processor.

A significant advantage of this smart diskette insertable element is that, by virtue of its insertability into a standard disk drive and interfaceability therewith, it is possible to carry-out operations with the element's processor, such as encryption and decryption of data or verification of user identity, without requiring a special interface or plug-in board which might be suitable only for a particular computer system.

Another advantageous feature of the smart diskette insertable element is its ability to store additional data and/or programs in on-board memory connected with the element's processor. This considerably increases the potential areas of application for the element.

The smart diskette element disclosed in the above patent and application, may also be equipped with a battery power source supplying power to other electronic components within the element.

The interface of the smart diskette insertable element is designed to allow data to be relayed through it, between the element's processor and the read/write head of the disk drive. One way of achieving this is to place an electromagnetic component, e.g., one or more coils, in the vicinity of the interface which is able to generate magnetic field information equivalent to that generated by the magnetic disk of a standard, e.g., floppy, diskette. In this way the interface is therefore able to simulate the magnetic disk. This property of the interface allows data to be transferred from the element's processor to the EDP-equipment, e.g., data which enables user identification to be verified, thereby providing security to the EDP equipment. The interface receives signals coming from the EDP-equipment via the disk drive write head and passes these on to the element's processor. This exchange of data makes a variety of operations possible, as would be recognized by one skilled in the art.

The smart-diskette disclosed in the above patent and application may also be provided with an alpha-numerical display and/or keypad. The keypad and/or display may be in the form of a separate module attached physically and electrically to the smart diskette element so that it is visible even when the smart-diskette is inserted in the disk drive of a computer terminal.

As processor capabilities expand and memory devices with increasing capacity become smaller, the smart diskette takes on the potential for more and more useful applications.

Copending application Ser. No. 08/211,488 (Atty Docket No. LWBR 0019) discloses a read/write unit with a read/write head and optional electrical contacts, but without the standard disk driving and head moving parts, for use in a desk-top PC or notebook computer to communicate with a smart diskette. By eliminating the drive motor and moving read/write heads, energy otherwise expended by the use of such moving parts is avoided.

Further, such a read/write unit, since it eliminates bulky drive and head motors, can be made more compact than a standard disk drive, thereby reducing the overall size requirements for the computer in which it is installed.

Such a read/write unit in conjunction with a smart diskette operating as a security device can also provide protection from unauthorized use of the computer in which it is installed. Protection against access to the computer, and consequently, any network to which it is attached, is achieved with the aid of the smart diskette which contains corresponding authorization codes and the like, but which can also be used with standard commercially available, e.g., 3½" drives.

Since a normal diskette cannot operate with the read/write unit, an unauthorized user cannot exchange data with the read/write unit. The optional electrical contacts can be used to power the smart diskette components from the computer device in which the read/write unit is installed, and/or to provide another path for data exchange.

Possible applications and advantages of such a read/write unit include providing convenient add-on memory without the need of a special interface, such as PCMCIA. In this regard, the read/write unit operates with a smart diskette having on-board memory of several megabytes, for example.

The read/write unit is particularly useful with notebook and notepad type computers, where energy conversation and weight are very important, since the read/write unit does not have bulky energy consuming moving parts.

This read/write unit can be used with conventional EDP devices as well, e.g., desk-top personal computers, to provide additionally security, functioning as a 3½" drive which can be used only with smart diskettes, and not with conventional diskettes.

Simple data exchanges between conventional 3½" drives and notebooks/notepads equipped with the energy conserving read/write unit are facilitated using smart diskettes. In addition, higher data flow rates than with conventional floppy drive units, e.g., up to several Mbit/sec, are achievable with this read/write unit.

Pocket calculators and diary devices are known and gaining acceptance with busy executives, for example. However, such devices have numerous limitations and disadvantages. For example, although such devices can interface with a desk-top computer to download application programs and/or data, for example, or to upload data entered on the pocket device to the desk-top computer, to do so currently requires inconvenient cabling, and/or a special interface unit, e.g., PCMCIA, with associated costs.

In addition, such pocket devices are generally limited to a single special application, such as a phone directory, or a golf-handicap calculator, and do not provide the range of capabilities of a notebook computer, for example. Although some pocket devices are "programmable," this is often achieved only through the insertion and removal of a limited set of specially made ROM integrated circuit modules available from the manufacturer of the pocket device.

Pocket-sized pagers and cellular telephones are also known. However, these respective devices do not generally have the capability of functioning as anything except a pager or telephone, that is, they are generally devices which are dedicated to a single function.

Therefore, the fully-equipped, fully-functional executive may be burdened by having to carry around a variety of separate devices, which further disadvantageously cannot readily interface with one another.

SUMMARY OF THE INVENTION

The present invention pocket interface unit (PIU), in conjunction with a smart diskette having ever increasing capabilities, solves the above-mentioned problems and disadvantages of the current portable devices, and provides new and useful applications for the smart diskette.

The PIU is a small portable device which provides a smart diskette with various user interfaces. For example, the PIU can provide the smart diskette with a display, buttons, a keypad or keyboard, a mousepad or trackball, etc.

The PIU can further provide peripheral interfaces, for example, infrared (IR) communications for a printer, mobile (cellular) telephone and/or wired telephone, short range electromagnetic receiver for heart-rate monitor, cyclometer, etc.

The PIU can itself provide peripheral functions, such as a modem, a mobile (cellular) telephone (data and/or voice), loudspeaker, microphone, etc.

One advantageous aspect of the PIU device is that it is configured as a portable pocket-sized device, and allows a smart diskette, which has had data and programs downloaded from a PC via the standard 3½" floppy diskette drive, for example, to be used for various applications away from the PC.

A further advantage is that, subsequent to use away from a PC, any new data entered or data modified in the smart diskette via the PIU can be uploaded into almost any PC and used, e.g., stored, processed, communicated, etc., by a PC application program.

Advantageously, the PIU device incorporates electrical contacts and/or a read/write unit without energy consuming moving parts, e.g., disk drive motor and/or head moving motor, providing a way to store data entered remotely, while on an airliner, for example, to a smart diskette, the data being later transferred to a portable or desk-top PC from the smart diskette.

By providing a portable device which incorporates a variety of peripheral functions, the need of an executive to carry multiple devices to be fully-equipped is substantially reduced or eliminated.

Flexibility is enhanced with the PIU and smart diskette combination which advantageously provides a number of pocket size electronic devices, e.g., computers, organizers, games, fitness/sports performance monitors, pagers, etc.

Advantageous connectivity through a simple interconnection via a standard 3½" floppy diskette drive to almost any PC is achieved with the PIU according to the present invention.

Advantageous portability is provided by the design in which the PIU with smart diskette can fit into a coat or shirt pocket to be carried and used practically anywhere.

Additionally, an element (diskette), which can be plugged into an EDP installation, consists of two components which can be plugged together. One component possesses the external shape of a diskette and serves as a frame to accommodate the second component, which contains all or some of the electronic units. Some of the electronic components can also be located inside the frame.

The advantages of this measure are that the dimensions of the second component are smaller than the dimensions of the diskette. The second component has the dimensions of a mini-chip card, a chip card (0.8 mm or 2 mm thick) or a card with the dimensions 55 mm×60 mm×3 mm. These cards can be transported without difficulty in a purse or wallet. Consequently the advantages of the element as stated in the German patent registration P 39 03 454 A1, are combined with the advantages of a chip card. The disadvantages of a chip card, such as limited memory and processor capacity as well as the fact that it requires a special read/write device, are eliminated by this invention. The functions of the Smartdiskette, as stated in the German patent registration P 39 03 454 A1, can also be performed using this invention. An additional function is described here as an example. Here we are referring to a patient's data card as set down in the German disclosure provision DE 35 34 638 A1. The disadvantage of the patient data card in the specified form of a standard commercial diskette is that the personal data related to the patient can be read at any time as the data stored on commercially available diskettes are uncoded. A further disadvantage lies in the dimensions of a standard diskette. It cannot be transported comfortably like a chip card in a purse or wallet.

As is also stated in the above-mentioned disclosure provision, patient data can be stored on magnetic strip cards or chip cards. The magnetic strip cards have the advantage of small dimensions, but the same disadvantage as standard commercial diskettes with respect to the easy reading of personal data. The chip card does not have this disadvantage. Confidential data can be safely stored on this medium. They can only be accessed when the correct secret code has been previously entered. The disadvantages of a chip card are that an insufficient amount patient data can be stored on this medium and that special read/write devices are required.

With this invention the disadvantages stated are completely eliminated. The diskette drive of any personal computer and the magnetic interface located in the element itself serve as the interface for the reading and writing of the patients data. Depending on the model of the pluggable board in the frame several megabytes can be stored there. Reading and writing of the data is only then permitted by the processor-also integrated into the frame once a secret access code has been entered and this has been identified as correct by the processor.

BRIEF DESCRIPTION OF THE DRAWINGS

The above and other features and advantages of the invention will become apparent from the following detailed description taken with the drawings in which:

FIG. 7b shows a cross-section of the smart diskette of FIG. 7a; and

FIG. 10a shows a frame of the Smartdiskette with battery (s) 802, and plugs 808 as current interface to the processor/memory card as well as a recess 809 where normally the drive for a magnetic disk is located.

FIG. 10b is a cross-section of FIG. 10a with lateral guide rails.

FIG. 10c shows a processor/memory card with external dimensions of a chip card but 2 mm thick with processor 806, memory card 807 and plugs 808 as data and current interface to the frame of the Smartdiskette as well as converter 803 and controller for magnetic interface 805.

FIG. 10d is a cross-section of FIG. 10c with appropriate sides so that the processor/memory card can be inserted into the guide rails of the frame of the Smartdiskette.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not be construed as limiting the inventive concept to any particular physical configuration.

Figure 1:
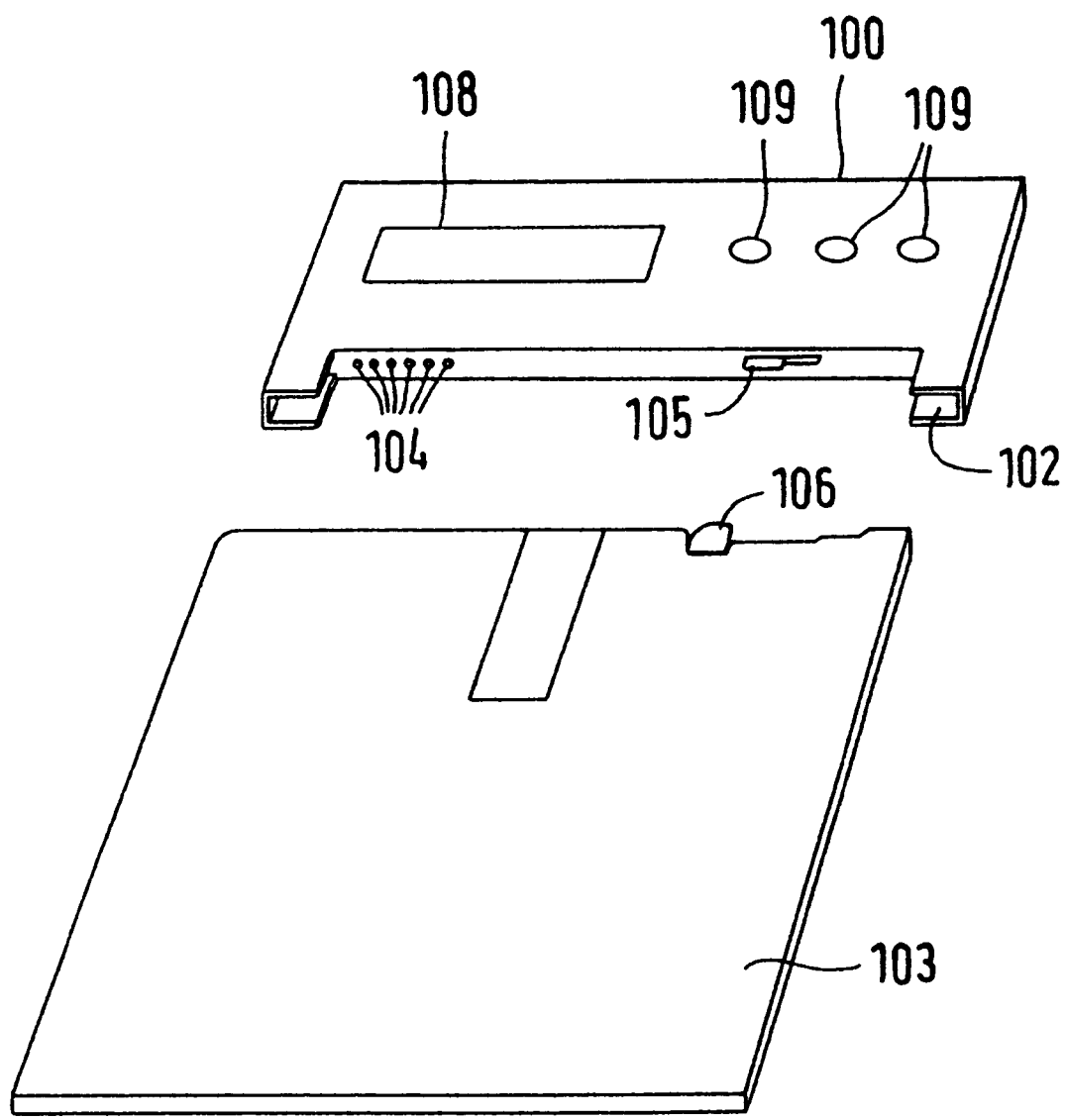
FIG. 1 shows a first embodiment of a PIU according to the invention, a "mini" PIU, having a slot for physical attachment to a smart diskette, electrical contacts to exchange data with the smart diskette, a mechanism to operate a switch on the smart diskette and a battery.

The "mini" PIU 100 according to a first embodiment of the invention, illustrated in FIG. 1, has, for example, a slot 102 for physical attachment to a smart diskette 103, electrical contacts 104 to exchange data with and/or provide power to the smart diskette 103, a mechanism 105 to operate a switch 106 on the smart diskette 103 switch, and an optional battery (not shown). The switch 106 powers the smart diskette 103 when it is inserted into a drive or PIU device. The slot 102 may include detentes therein which fit into corresponding recesses in the smart diskette 103, for example, or other such conventional securing means, for removably securing the smart diskette 103 to the PIU 100.

The optional battery (not shown) could be accessed from the underside, i.e., the side opposite the display, through a conventional access panel, for example. The smart diskette 103 itself may contain an internal battery (not shown) as well.

Figure 5:
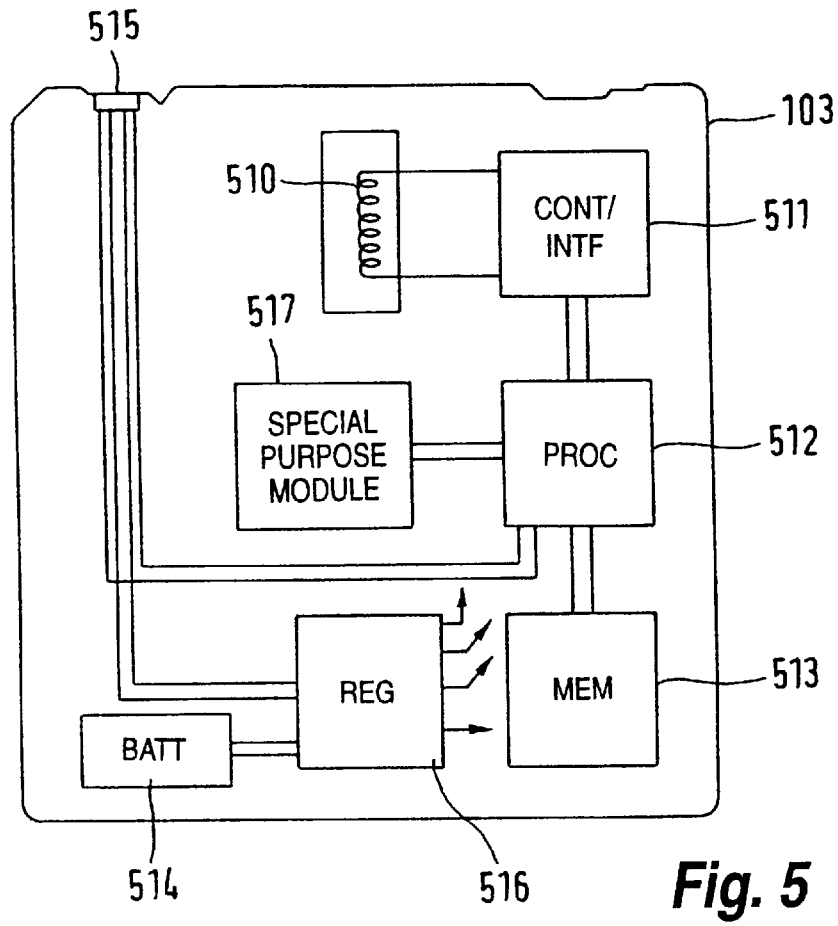
FIG. 5 shows an exemplary embodiment of a smart diskette.

Besides processor, memory and interface circuitry, the smart diskette 103 may also include a real-time clock, and special purpose modules, such as for implementing a cellular telephone, pager, heart-rate monitor, etc. Operating system firmware would be provided on the smart diskette 103, and application program instruction could either be provided in firmware, be down-loaded into RAM memory, or a combination of both. FIG. 5, which will be described below, shows an exemplary smart diskette in more detail.

With the illustrated optional display 108 and buttons 109 a user can read displayed text or graphical data transferred from the smart diskette 103 and, for example, enter selections from a menu presented on the display 108 by actuation of an associated button 109. One of the buttons 109 could advantageously be a manual override power switch to override the switch 106 and de-power the smart diskette 103.

The currently widespread liquid crystal display (LCD) technology provides an effective energy efficient display for use with the PIU 100. Although not illustrated, the PIU display 108 would incorporate convention circuitry for driving the display 108 based on data transferred from the smart diskette 103. Alternatively, such display driving circuitry could be incorporated into the display 108 itself, or provided on the smart diskette 103, if practical.

The button 109 can be configured as mechanical switches, for example, of various conventional types. Conventional circuitry for detecting/decoding the actuation of a button 109 could be provided on the PIU 100 or alternatively the smart diskette 103, as with the display driving circuitry.

Optional further interfaces (not shown) to peripheral devices may be provided on the mini PIU 100, e.g., to a heart-rate monitor or cyclometer, as would be readily apparent to one skilled in the art. These further interfaces may be, for example, infra-red, wired, or wireless links.

For example, a heartbeat detector would transmit pulses of data corresponding to a user's heartbeat via a wireless link to the mini PIU 100 and hence into the smart diskette 103. The smart diskette 103 would store a continuous count of incoming heartbeats and use an on-board real-time clock (not shown) to calculate heart-rate at pre-programmed timing intervals. The user would subsequently insert the smart diskette 103 into a PC's standard 3½" floppy disk drive and to run an application program on the PC which would display the recorded heart-rate data and, for example, show comparisons with previous measurements. Further, with the optional display 108 and buttons 109, a user can have an immediate/continuos read-out of his/her heart rate on the PIU 100.

Figure 2:
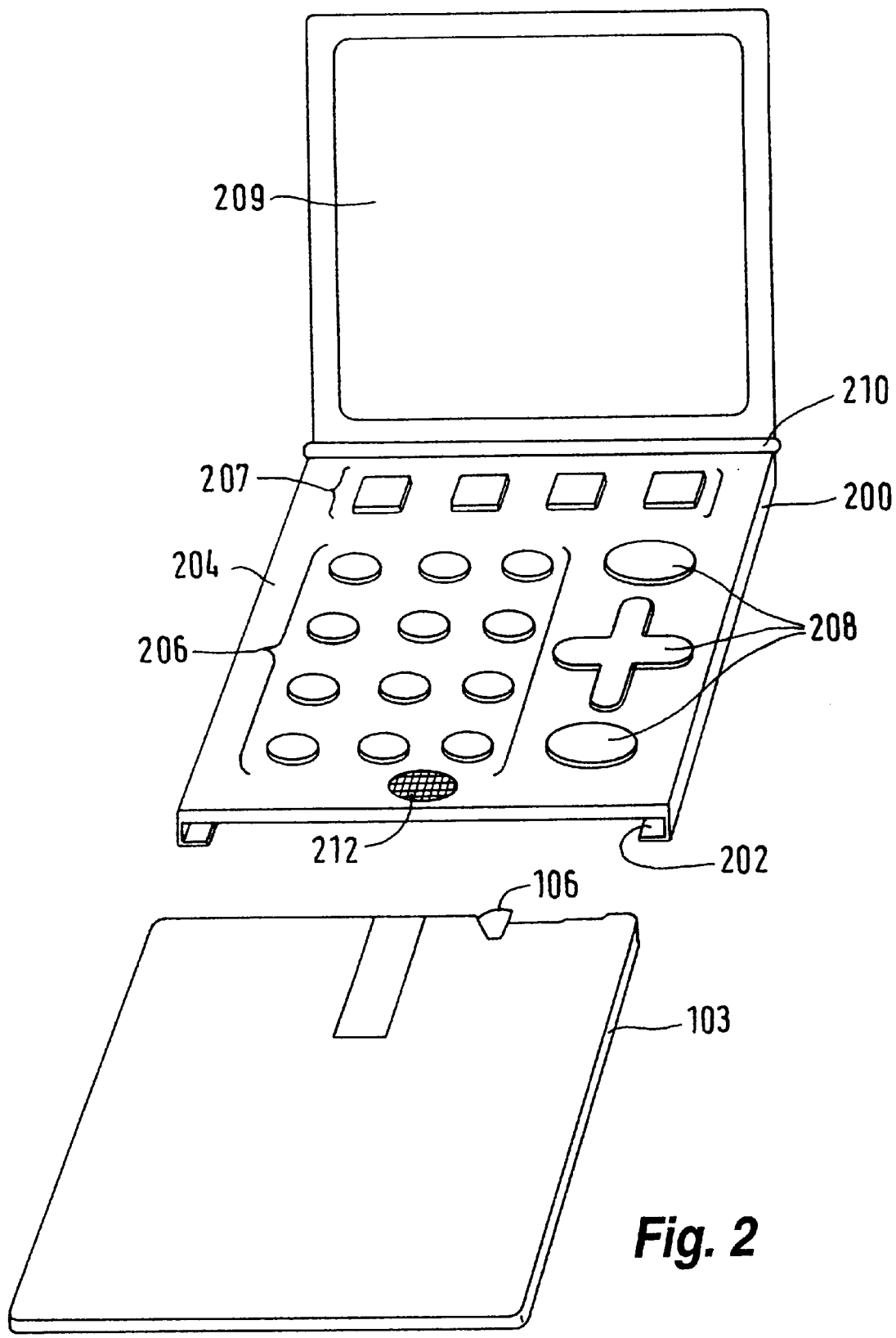
FIG. 2 shows a second embodiment of a PIU of approximate dimensions 3½"×3½"×0.5" with a slot for physical attachment to a smart diskette, electrical contacts and/or a magnetic transducer to exchange data with the smart diskette, a mechanism to operate a switch on the smart diskette and a battery.
Figure 6:
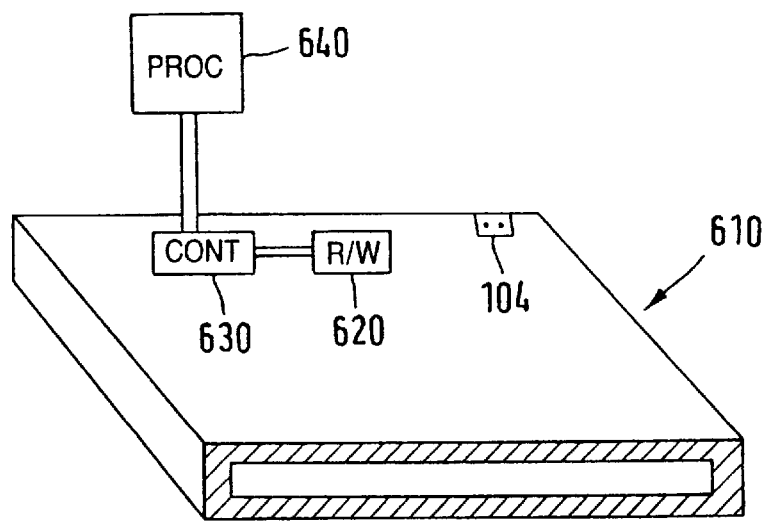
FIG. 6 shows a read/write device having no drive or head motors for use with a smart diskette.

A PIU 200 according to the second embodiment of the invention is illustrated in FIG. 2. The PIU 200 according to this exemplary embodiment would have the approximate dimensions of 3½"×3½"×0.5", for example, and includes slot 202 for physical attachment to a smart diskette 103. Either electrical contacts (104) as in the first embodiment (FIG. 1) and/or a magnetic transducer as in the read/write unit according to related copending application Ser. No. 08/211,488, now U.S. Pat. No. 5,471,038 is provided in the PIU 200 to exchange data with the smart diskette 103. Also provided on PIU 200, but not shown, is a mechanism to operate smart diskette switch 106, and an optional battery, as in the first embodiment of FIG. 1. An exemplary read/write unit is illustrated in FIG. 6, and will be described in more detail below.

Further the illustrated PIU 200 incorporates a keypad 204 provided with, for example, alpha-numerical 206, function keys 207, and cursor control keys 208, a display 209, open/closeably connected to the PIU 200 by a hinged 210, for displaying data and/or graphics, with optional touch-screen functions provided through appropriate design and programming, and a piezo-electric beeper, for example, (not shown). As with the first embodiment, conventional circuitry for driving the display, keyboard and beeper could be provided on the PIU 200, or alternatively, the smart diskette 103.

Further optional features envisioned could include a conventional transducer or transducers 212, and circuitry (not shown) to operate the PIU 200 as a cellular telephone and/or pager. As with the first embodiment 100, optional interfaces (not shown) to peripheral devices may be provided for on the PIU 200, as would be readily apparent to one skilled in the art.

The second embodiment PIU 200 could be used as follows, for example. A user would insert a smart diskette 103 into a standard 3½" floppy diskette drive of a PC and download, for example, a diary program and data from a PC application into the memory of the smart diskette 103. The smart diskette 103 would then be removed from the PC and inserted into the PIU 200 according to the second embodiment, which may be carried around easily and transported anywhere in the user's coat or shirt pocket. The PIU 200 can then be used to display on display 209 the diary, and update it via the keypad 204 or touch-screen 209 no matter where the user is located, for example, on an airliner or train, or in a restroom. The optional real-time clock inside the smart diskette 103 can produce an audible signal through the PIU piezo-electric beeper (not shown) to warn the user of appointments, etc. thereby functioning as an alarm clock.

Figure 3:
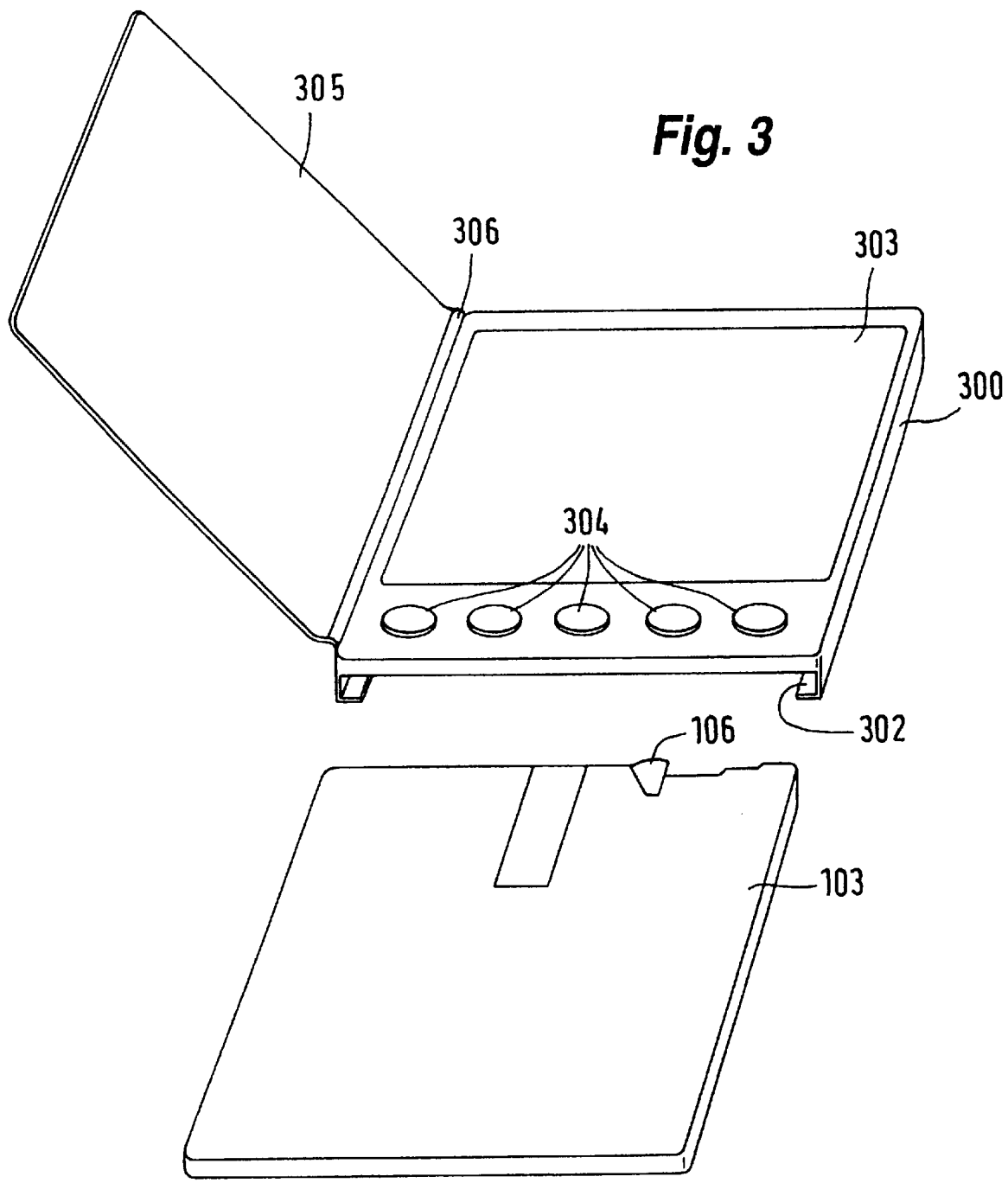
FIG. 3 shows another embodiment of a PIU having similar dimensions and features as the embodiment of FIG. 2, but having a touch-screen or write-on display plus a few buttons replacing the keypad as the means of user input.

The next exemplary embodiment illustrated in FIG. 3 is a PIU 300 with similar dimensions, i.e., sized to fit easily in a coat or shirt pocket, and features as the embodiment (200)

of FIG. 2. The PIU 300 has a slot 302 for accommodating a smart diskette 103, a touch-screen or write-on display 303, and a few buttons 304, instead of the keypad 204 of the second embodiment (200) for user input. An open/closeable cover 305 to protect the display 303 is connected to the main body of the PIU 300 by hinge 306, for example.

Further options which could be included in the embodiment of FIG. 3 would be generally the same as for the embodiment (200) of FIG. 2, that is, conventional transducers and circuitry to operate as a cellular telephone and/or pager, optional interfaces to peripheral devices, etc., as would be readily apparent to one skilled in the art.

Figure 4:
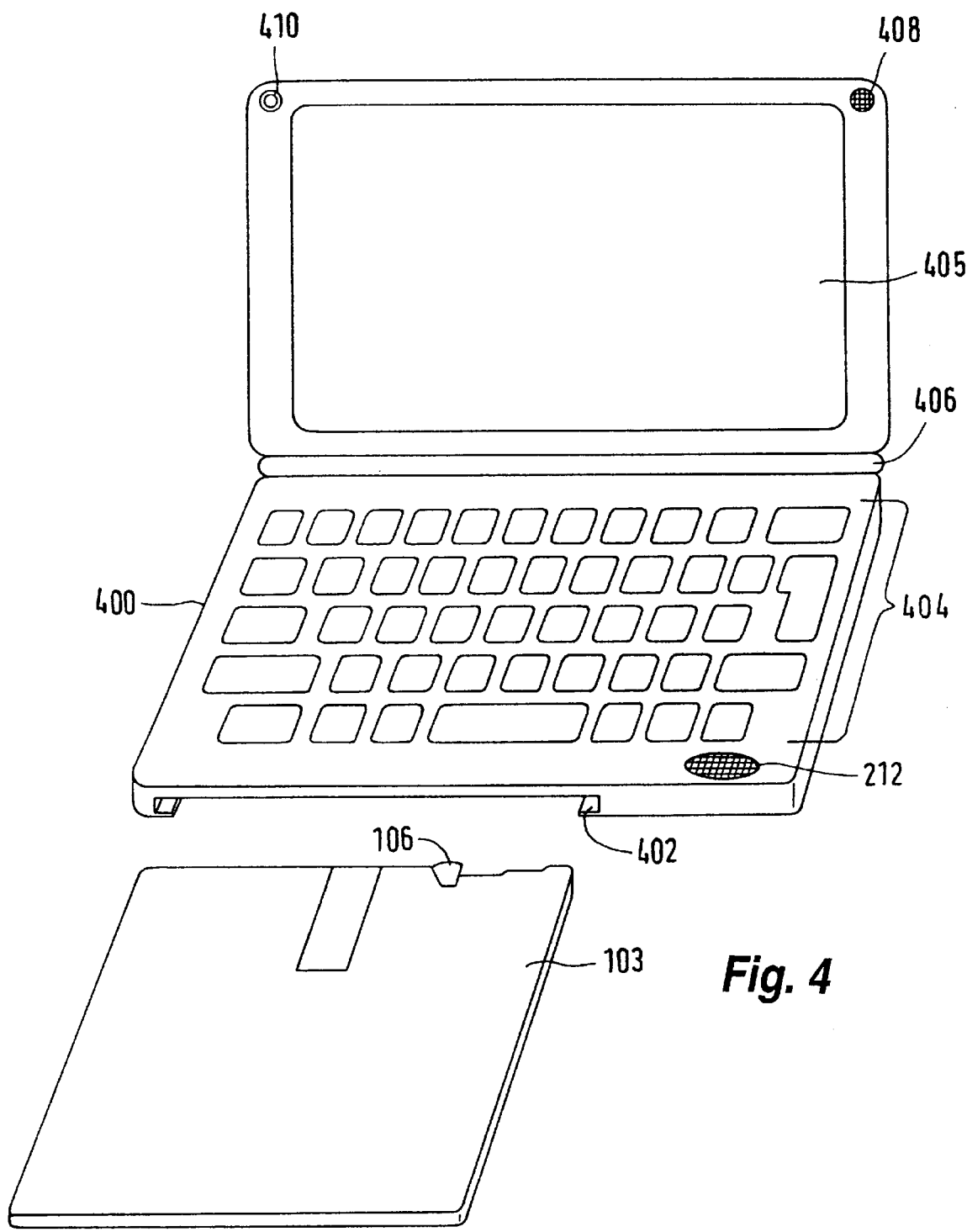
FIG. 4 shows another embodiment of a PIU having the approximate dimensions of 6"×5"×0.75" and having a slot for physical attachment to a smart diskette, electrical contacts to exchange data with the smart diskette, a mechanism to operate a smart diskette switch and a battery.

FIG. 4 shows another embodiment of a PIU 400 having, for example, the approximate dimensions of 6"×5"×0.75", with a slot 402 for physical attachment to a smart diskette 103, electrical contacts and/or magnetic transducer (not shown) as in the previously described embodiments to exchange data with the smart diskette 103, a mechanism (not shown) to operate a smart diskette switch 106, and an optional battery.

This exemplary illustrated embodiment has a small-sized computer "qwerty" keyboard 404 and a relatively large display 405 open/closeably attached by hinge 406 to the PIU body. Also illustrated is an exemplary location of an optional microphone 408 and micro-camera 410. Associated conventional electronic circuitry (not illustrated) for these optional devices 408 and 410 would be located either in the PIU 406 or the smart diskette 103.

Further options for this exemplary embodiment include those mentioned above for the other embodiments, i.e., a conventional transducer or transducers (212), and circuitry to operate as a cellular telephone and/or pager, optional interfaces to peripheral devices, etc., as would be readily apparent to one skilled in the art.

FIG. 5 illustrates an exemplary smart diskette 103 for use with a PIU according to an embodiment of the present invention. A magnetic transducer 510 is electrically coupled to control/interface block 511 to accomplish data transfers to and from a corresponding read/write head in the PIU. The control/interface block 511 is further coupled to processor block 512. Memory block 513, which represent RAM, ROM, EEPROM, Flash memory, etc., is coupled to the processor block 513. Battery 514 supplies power via regulator 516 to the various components. Alternatively, power may be supplied through contacts 515 from the PIU, as previously described.

Also, data transfers may be accomplished through contacts 515 if the PIU does not provide a read/write head. Special purpose module block 517 represents the circuitry necessary to implement a special function, e.g., cellular telephone, pager, etc.

FIG. 6 illustrates an exemplary read/write unit 610, provided with contacts 104, a read/write head 620, and a control block 630 which is shown coupled to an external processor 640.

It will be understood that the above description of the present invention is susceptible to various modifications, changes and adaptations, and the same are intended to be comprehended within the meaning and range of equivalents of the appended claims.

For example, the illustrated embodiments are PIU's for use with a 3½" sized smart diskette, e.g., 2", 2¼" or 5¼" sized smart diskettes, for example, are considered within the scope of the present invention.

Although the illustrated PIU embodiments accommodate a smart diskette in a slot engagement arrangement, other arrangements are also envisioned. Instead of a slot, the PIU could snap-fit onto a op surface of a smart diskette, for example.

Although the described PIU's optionally include a battery, ther appropriate power sources may be provided instead of, or in conjunction therewith, for example, an array of solar cells could be provided on an upper surface of the PIU and/or smart diskette.

Although the smart diskette is described as having a microprocessor and program memory, this could be substituted in whole or in part with hard-wired logic circuitry, programmable logic arrays, or the like, as would be readily apparent to one skilled in the art.

The various transducers optionally provided are envisioned to include built-in microphones and speakers, and/or jacks for external microphones and speakers could be provided. Telephone and modem tone generators may be incorporated into the PIU's, as can be visible and infra-red light producing devices, and the like.

Various additional functionality could of course be provided by the smart diskette itself. For example, the smart diskette itself could include additional interface circuitry for coupling to a communications network, as disclosed in U.S. Pat. No. 5,457,590 and related copending application Ser. No. 08/479,747 (Atty Docket No. LWBR 0013D1), hereby incorporated by reference. The smart diskette could include circuitry for interfacing with any of a variety of peripheral devices, for example, a smart-card (IC) reader.

Figure 7A:
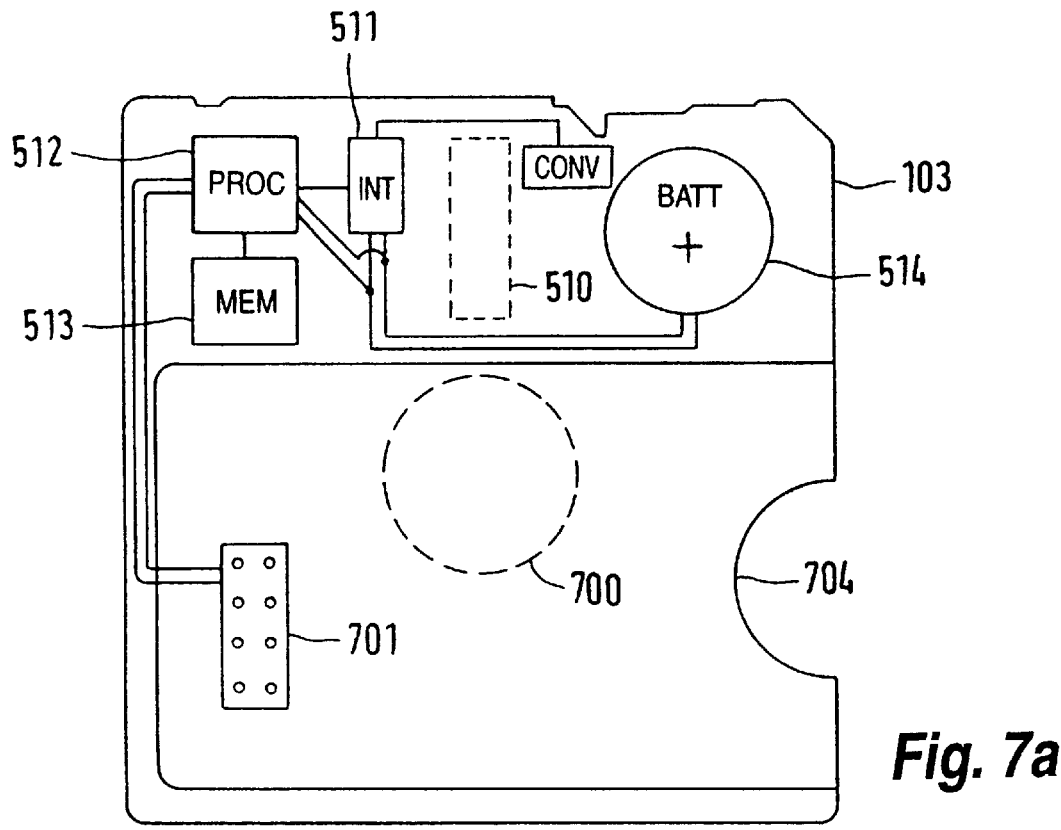
FIG. 7a shows a smart diskette adapted to receive an IC smart-card.
Figure 7B:
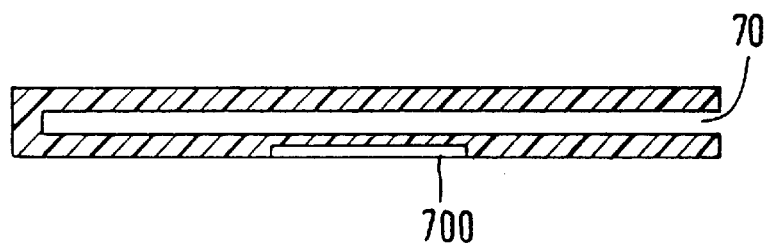
Figure 7C:
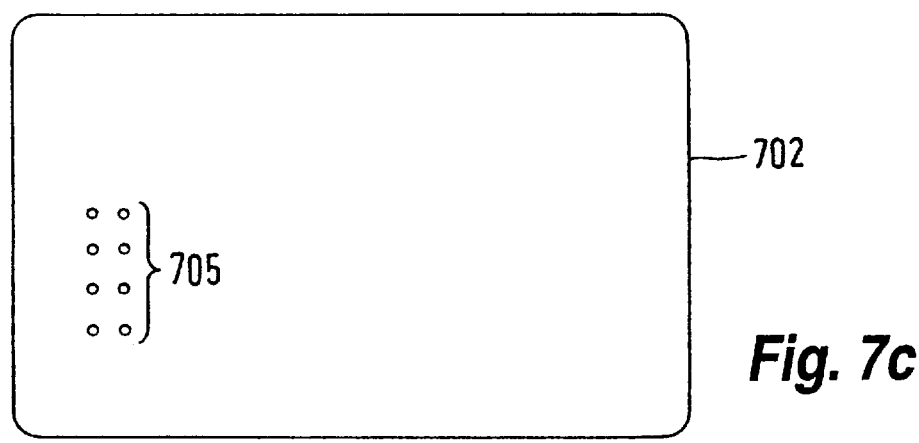
FIG. 7c shows an IC smart-card for insertion in the smart diskette of FIGS. 7 and 7b.

Alternatively, a smart-card reader could be built into the smart diskette, such as illustrated in FIGS. 7a, 7b and 7c, and disclosed in related copending application Ser. No. 08/170, 166, now U.S. Pat. No. 5,584,043 (Atty Docket No. LWBR 0017), hereby incorporated by reference.

Shown in FIGS. 7a–c is one example of a smart diskette 103 adapted to include contacts 701 for interfacing with a smart-card 702 and to include a slot 703 having a cut-out 704 for facilitating grasping the card 702, so that the card 702 is insertable in slot 703 and contacts 701 connect with corresponding contacts 705 on the card 702. The illustrated arrangement of some of the components on the smart diskette has been changed to accomplish this, e.g., battery 514, magnetic interface 511, processor 512, and memory 513. Of course, the location and size of the card receiving slot 703 and the number of contacts 701 would vary depending on the IC smart-card 702 to be accommodated. Recess 700 is disposed on the bottom of the smart diskette 103 where the drive for a magnetic diskette is normally located.

Figure 8A:
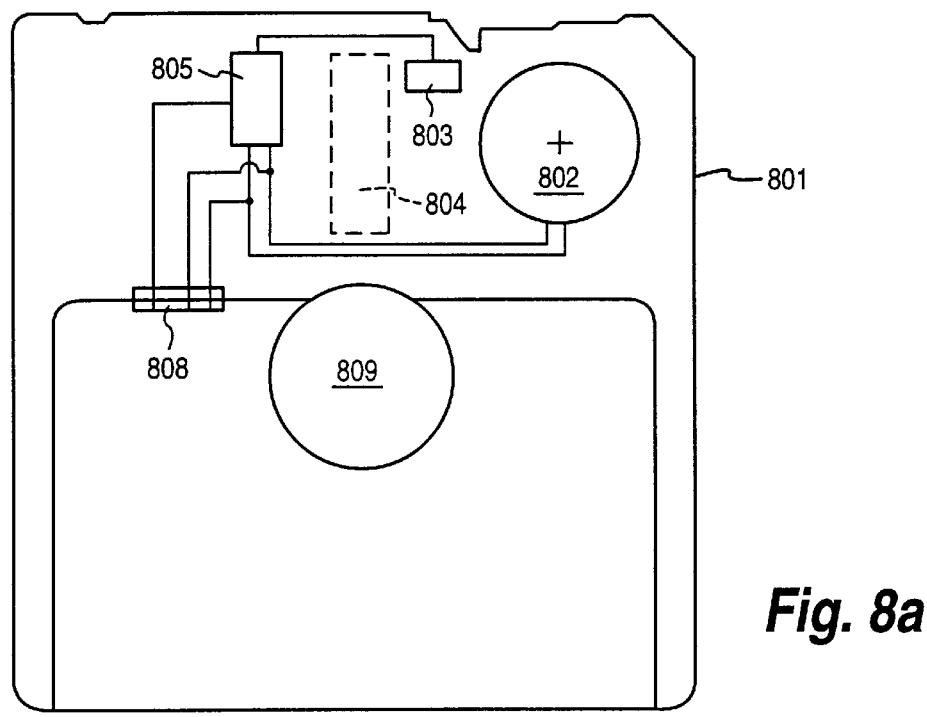
FIG. 8a shows a Smartdiskette with battery 802, converter 803, controller for magnetic interface 805 and plugs 808 as data and current interface for the processor/storage board (memory card) as well as a recess 809 normally reserved for the drive for a magnetic disk.
Figure 8B:
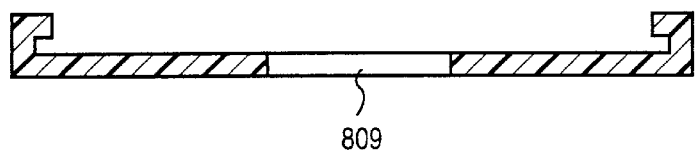
FIG. 8b is a cross-section of FIG. 8a with lateral guide rails and a recess 809 normally reserved for the drive for a magnetic disk.
Figure 8C:
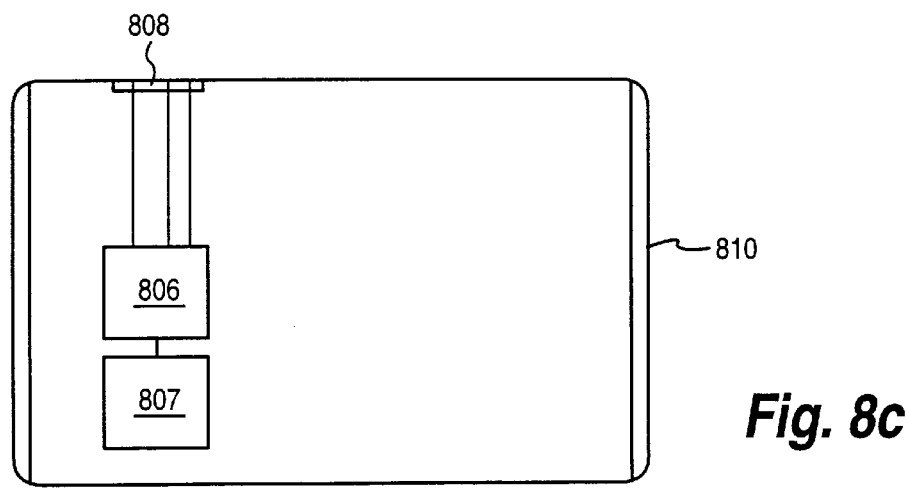
FIG. 8c shows a processor/memory card with external dimensions of a chip card but 2 mm thick with processor 806, memory chip 807 and plugs 808 as data and current interface to the frame of the Smartdiskette.
Figure 8D:
FIG. 8d is a cross-section of FIG. 8c with flattened sides so that the processor/memory card can be inserted into the guide rails of the frame of the Smartdiskette.

The Smartdiskette depicted in FIGS. 8a and 8b contains a recess of 2 millimeters to accommodate a processor/memory card 810 as well as plugs 808 in order to supply the processor/memory card 810 with current from the battery 802 and to produce a data link from the processor 806 of board 810 to the magnetic interface 805 of the Smartdiskette 801. Furthermore, the Smartdiskette 801 contains a recess 809 on the bottom side where normally the drive for a magnetic disk is located. The 2 millimeter thick processor/memory card depicted in FIGS. 8c and 8d contains in addition to the processor 806, a data memory 807 as well as plugs 808, in order to supply the Smartdiskette with current from battery 802 and to produce a data link from the processor 806 to the magnetic interface 805 of the Smartdiskette 801. Alongside the processor 806, the 2-millimeter thick processor/memory card contains a data memory 807 and plugs 808 for the current supply from the battery 802 of the SmartDiskette and for establishing a data link from processor 806 to the magnetic interface 805 of the Smart- Diskette 801. The wide sides are tapered to 1 millimeter so that the card 810 can be plugged into the recess of the SmartDiskette 801.

Figure 9A:
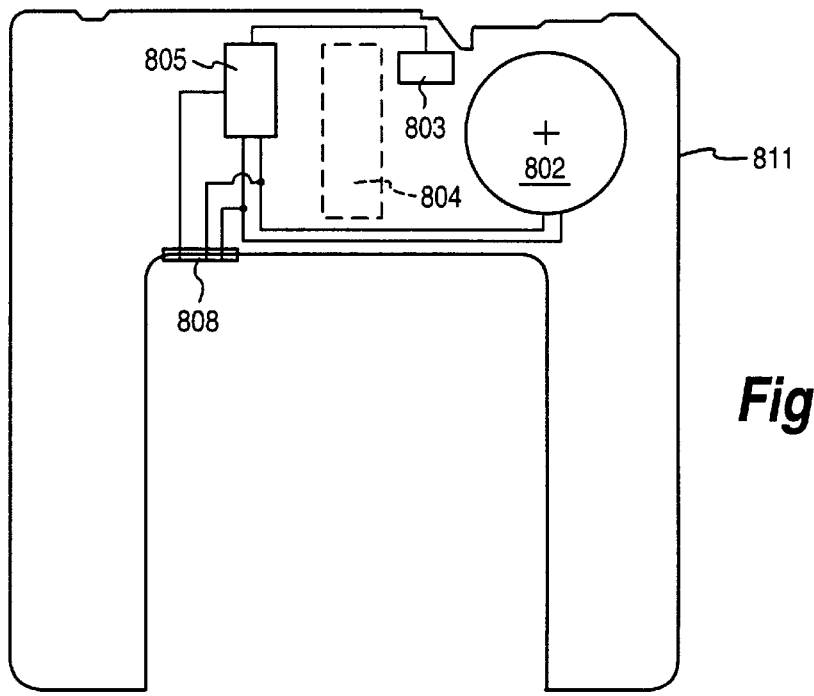
FIG. 9a shows a frame of the Smartdiskette with battery 802, converter 803, controller for magnetic interlace 805 and plugs 808 as data and current interface for the processor/memory card.
Figure 9B:
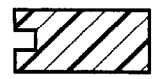
FIG. 9b is a cross-section of FIG. 9a with lateral guide rails.
Figure 9C:
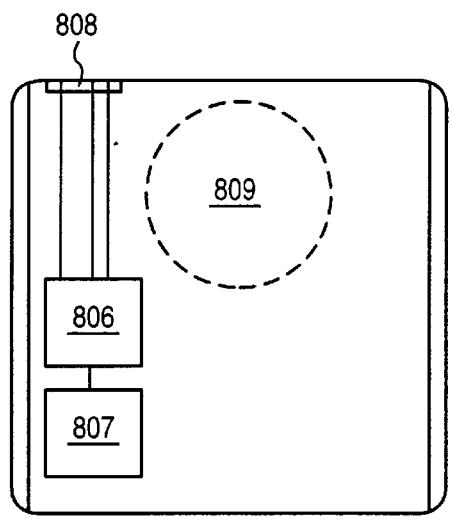
FIG. 9c shows a processor/memory card with external dimensions 60 mm×55 mm×3 mm with processor 806, memory card 807 and plugs 808 as data and current interface to the frame of the Smartdiskette as well as a recess 809 where normally the drive for a magnetic disk is located.
Figure 9D:
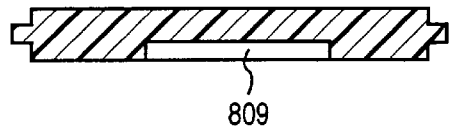
FIG. 9d is a cross-section of FIG. 9c with appropriate sides so that the processor/memory card can be inserted into the guide rails of the frame of the Smartdiskette as well as a recess 809 where normally the drive for a magnetic disk is located.

The SmartDiskette 811 shown in FIGS. 9a and 9b has a cutout with a 1-millimeter wide groove to accommodate a 3-millimeter wide processor/memory card 812 alongside plugs 808 for supplying the processor/memory card 812 with current from the battery 802 and establishing a data link from processor 806 of card 812 to the magnetic interface 805 of the SmartDiskette 811. Alongside the processor 806, the 3-millimeter thick processor/memory card shown in FIGS. 9c and 9d contains a data memory 807 and plugs 808 for the current supply from the battery 802 of the SmartDiskette and for establishing a data link from processor 806 to the magnetic interface 805 of the SmartDiskette 801. The long sides contain a 1-millimeter thick spring which enables card 812 to be plugged into the cutout and the groove of the SmartDiskette 811. Further, card 812 contains a recess 809 on the bottom. The drive for a magnetic disk is normally located here.

The SmartDiskette 813 shown in FIGS. 10a and 10b contains a 2-millimeter recess for the accommodation of a processor/memory card with integrated magnetic interface 814 alongside plugs 808 for supplying card 814 with current from the battery 802. Further, SmartDiskette 813 contains a recess 809 on the bottom. The drive for a magnetic disk is normally located here. Alongside the processor 806, the 2-millimeter thick processor/memory card shown in FIGS. 10c and 10d contains a data memory 807, converter 803 and controller for magnetic interface 805, alongside plugs 808 for the current supply from the battery 802 of the SmartDiskette. The long sides are tapered to a width of 1 millimeter so that card 814 can be plugged into the recess of the SmartDiskette 813.

Figure 11A:
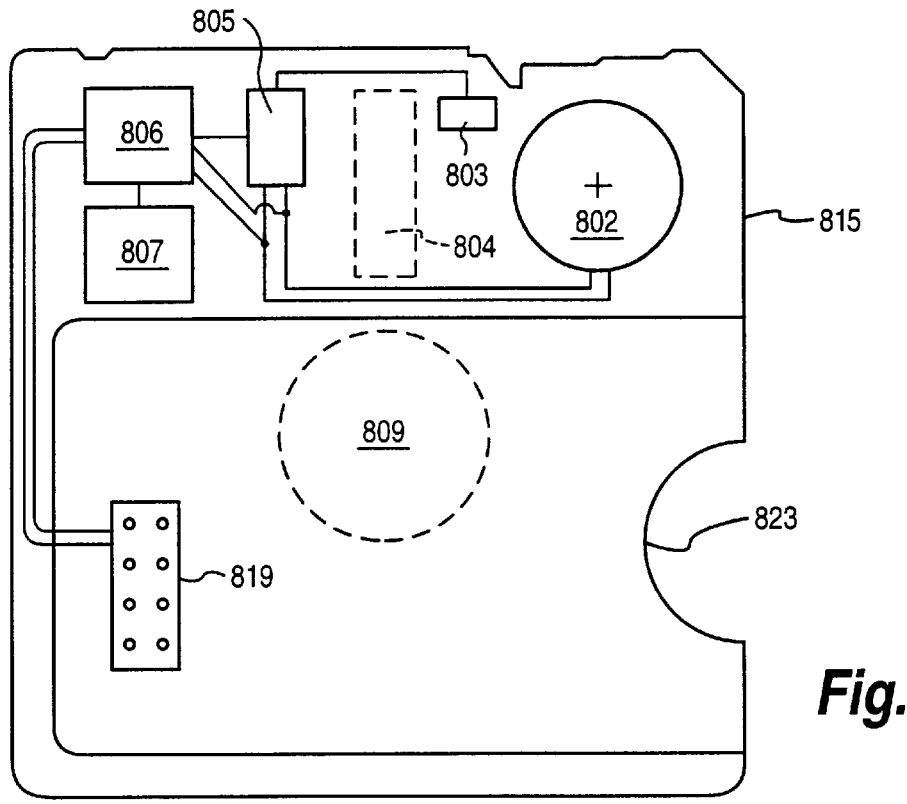
FIG. 11a shows a Smartdiskette with battery 802, converter 803, controller for magnetic interface 805, processor 806, memory card 807 and contact device 819 for chip card and recessed grip 823 for removing the chip card as well as a recess 809 where normally the drive for a magnetic disk is located.
Figure 11B:
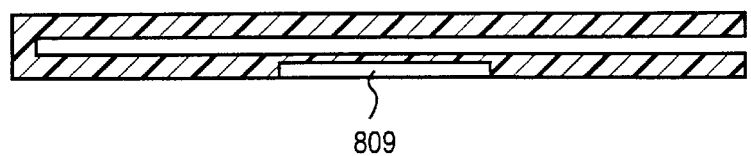
FIG. 11b is a cross-section of FIG. 11a with a recess for inserting a chip card and a recess 809 where normally the drive for a magnetic disk is located.
Figure 11C:
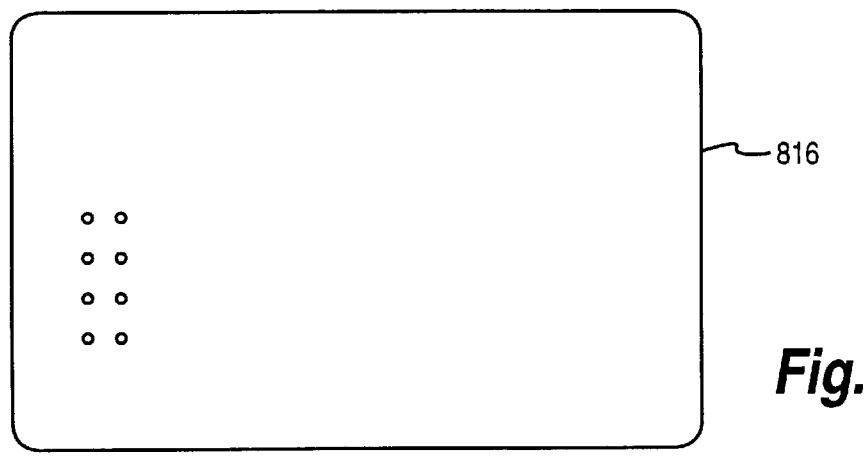
FIG. 11c shows a standard chip card with standard contacts, processor and memory card.

The SmartDiskette 815 shown in FIGS. 11a and 11b contains a 2-millimeter recess, in which a chip card 816 can be plugged in from the side alongside a contact device 819 which supplies the chip card 816 with current from the battery 802 and establishes a data link from the processor of the chip card 816 to the processor (806) of the SmartDiskette 815. Further, the SmartDiskette 815 contains a recess 809 on the bottom. The drive for a magnetic disk is normally located here. There is a recessed grip 823 for pulling out the chip card 816 at the right hand edge of the SmartDiskette 815. The chip card 816 shown in FIG. 11c is a standard 0.8-millimeter thick chip card with processor and a data memory. It also has contacts for supplying current from battery 802 of the SmartDiskette 815 and for establishing a data link from the processor of the chip card to processor 806 of the SmartDiskette 815.

Figures 12A, 12B:
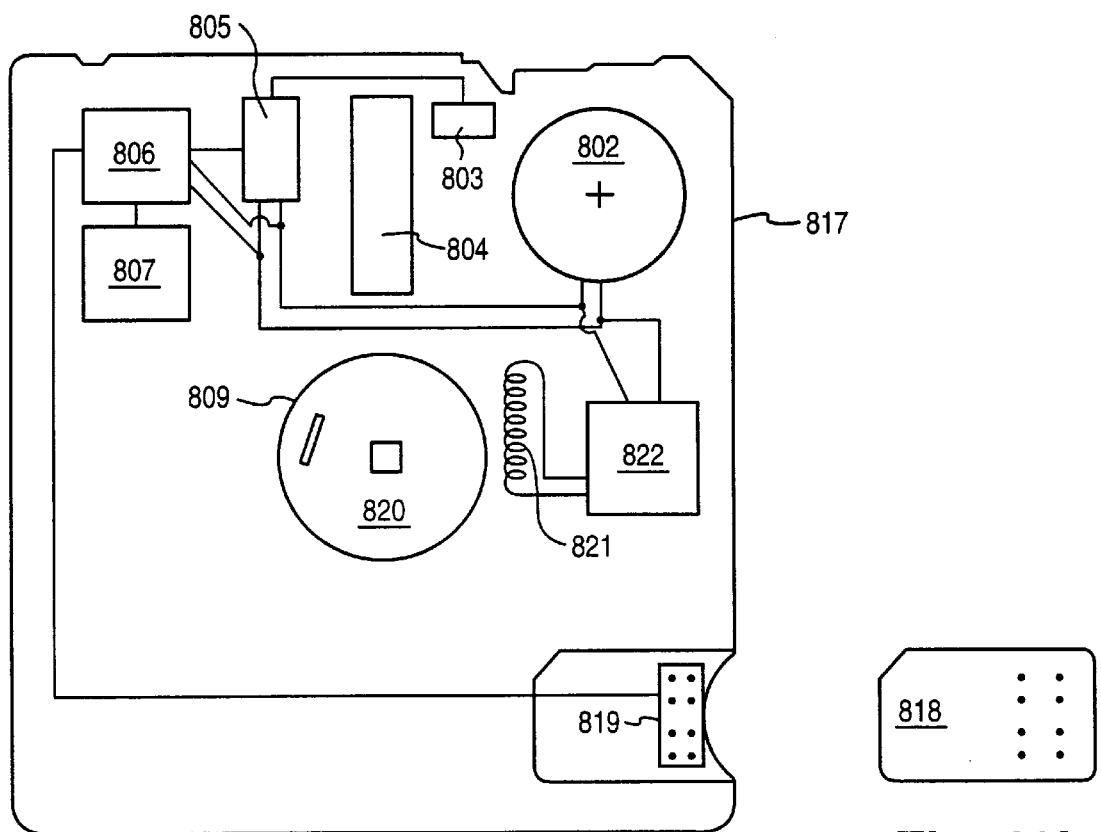
FIG. 12a shows a Smartdiskette with battery 802, converter 803, controller for magnetic interface 805, current generator consisting of rotor 820, stator 821, current regulator 822, contact device 819 for mini-chip card 818 as well as recessed grip 823 for removing the mini-chip card.
FIG. 12*b* shows a mini-chip card with processor and data memory.

The SmartDiskette 817 shown in FIG. 12a contains a 1-millimeter recess, in which a chip card 818 can be plugged in from the side, and a contact device 819 for supplying the chip card 818 with current from the battery 802 and for establishing a data link from the processor of the chip card 818 to the processor (806) of the SmartDiskette 817. Further, the SmartDiskette 817 contains a recess 809 on the bottom. The drive for a magnetic disk is normally located here. There is a recessed grip 823 for pulling out the mini-chip card 818 at the right hand edge of the SmartDiskette 817. The chip card shown in FIG. 12b is a standard 0.8-millimeter thick mini-chip card with processor and a data memory. It also has contacts for supplying current from battery 802 of the SmartDiskette 817 and for establishing a data link from the processor of the mini-chip card to processor 806 of the SmartDiskette 817. In this embodiment, the SmartDiskette includes battery 802 connected to a current generator comprised of rotor 820, stator 821, and current regulator 822.

A SmartDiskette, as described in this invention, with plug-in processor/memory card and all its associated advantages offers a wide range of possible applications, as can be seen from the following list:

Application Possibilities:
Read/write device for chip cards and mini-chip cards;
Communication of a chip card and mini-chip card with a PC;
Memory card with several megabytes storage capacity;
Memory card with integrated processor for checking an access code. The memory is enabled only if the access code is recognized as being correct;
A portable safe data carder, which can be carried comfortably in a purse or wallet, and which can communicate with any standard PC when it is plugged into the SmartDiskette.

Advantages:
Can be used in conjunction with any PC or workstation with 3½ inch drive;
Can be used with Laptops and Notebooks;
Is independent of the PC operating system capacity;
Is independent of the available interfaces and plug-in locations of the PC;
No normalization problems. Normalized interlaces are already available;
There are no hardware installation costs;
Higher data rate (up to 500 kbit/sec);
Space-saving and portable;
High storage capacity (several megabytes).

Besides the general security features described above, a wide variety of security related features may be provided by appropriate programming and/or configuring of the smart diskette and/or PIU. For example, a PIU could be provided with a ROM containing a security code which would render it useless with a smart diskette which does not have a corresponding code. Alternatively, the smart diskette could prompt a user for an identification code upon insertion into a PIU, and deny access unless the correct code is entered on the PIU keyboard/keypad.

Besides those applications described above, it is envisioned that the PIU with inserted smart diskette could function to provide an electronic spread-sheet, a perpetual calendar, a telephone directory, a word processor, entertainment (game) programs, English-foreign language dictionary, financial calculator, stock quote and/or analysis, or any other of the multitude of applications currently available for desk-top and notebook computers.

Other sorts of devices could be built into the PIU, for example, a scanner for scanning written documents into memory, or a micro-camera (410 in FIG. 4) for providing video image storage and/or transmission over cellular telephone, for example. If disguised as or incorporated into an innocuous household or office item, such as a book or lamp, a PIU equipped with an audio or video input device could be used to provide secret monitoring of an area. A smart diskette could be programmed to periodically record in its memory, for example, once a minute, a snap-shot of audio or video input from such a PIU. Subsequently, the smart diskette would be removed and the snap-shots retrieved into a personal computer by security personnel for analysis.

A PIU with a bar code reader could be used in inventory applications. For example, inventory bar codes would be scanned and/or keyed in, and stored in the memory on the smart diskette. Subsequently, the smart diskette could be removed from the PIU and inserted in an inventory control computer's 3½" disk drive for retrieval and processing.

A PIU equipped with a microphone (408 in FIG. 4) could be used as a dictation device where spoken text is digitized and stored in the smart diskette, or in various application utilizing speech recognition technology. In the latter case, smart diskette 103 would be provided with work/phrase recognition software in memory 513, for example, and/or special purpose module 517 could be a vocoder analyzer, e.g., a programmed digital signal processor for implementing liner predictive coding (LPC). The PIU with smart diskette so configured then could function as a voice response system, i.e., programmed to respond to simple voice commands such as "save" or "run."

Alternatively, the PIU with smart diskette configured with microphone 408 and speech recognition software/module could function as a speaker recognition system i.e., a system which recognizes and/or verifies a particular person (speaker) producing the speech. The verification could be used to obtain access to the PIU functionality.

On the other hand, a PIU equipped with a keypad, display and loud-speaker, for example as in FIGS. 2 or 4, could be used as an aid for speech-impaired individuals, where words and/or phrase codes could be keyed in, and spoken text accessed on the smart diskette and output through the loudspeaker. Conventional text to speech circuitry could be provided on the smart diskette in the special purpose module 517, and/or software in memory 513, for such an application.

The PIU keypad could further incorporate a braille keyboard for use by sight-impaired individuals. Foreign language keyboards could be enabled through software and/or be provided as specific PIU's.

Specific medical information about an individual could be stored on a smart diskette, and medical personnel could access the information in an emergency either through a PIU or a hospital computer's 3½" disk drive. Such a smart diskette could be labeled with the international red cross symbol, or the like, identifying it as containing vital medical information. Such information could be stored in the smart diskette in any or all of the major languages for use when travelling abroad. Emergency contacts, such as family or medical specialists to contact in case of an emergency could be stored therein as well.

In a PIU equipped with a cellular telephone module, a panic button or emergency code could be provided on the PIU which would direct the smart diskette with PIU to automatically call emergency personnel. If also equipped with a heart rate monitor, in case of irregular heart beats, or other abnormal heart activity indicative of a medical emergency, the smart diskette could be programmed to call emergency personnel automatically.

The smart diskette could be loaded with bank transaction software and/or a specially configured PIU provided so that banking activities could be readily accomplished remotely. In such an application, security features such as are used conventionally in remote banking would be naturally provided.

A PIU with appropriately programmed smart diskette, could be used as an electronic answer sheet. For example, instead of providing test-takers with pencils and paper answer sheets, each test taker would be given an appropriately programmed smart diskette and PIU. The PIU would be provided with a display and numeric or alpha-numeric keypad. The smart diskette would be programmed to prompt the test taker for his/her unique identification number, such as a social security number or student ID number.

After entering and verifying the ID as being associated with a bonafide student, the smart diskette would prompt the test-taker to open the test booklet and begin the test. TIhe smart diskette with PIU would then display something like "Q1?" and wait for the test-taker to input the number corresponding to his/her answer selection for the first question. When the first answer is entered, the smart diskette would record the answer in its memory and display a prompt for the next question. A built in timer could be provided which would end the test after a pre-programmed time had elapsed.

After the test had been completed, the test-takers would turn-in their smart diskettes and PIU's. To grade the test, the test-giver would simply remove each smart diskette from its PIU, and insert each smart diskette into the 3½" disk drive of a personal computer programmed to access the test-taker's ID and answers, and determine a raw score.

After loading all the test-takers' data, the personal computer could readily identify question which should be discarded or discounted because all test takers missed them, for example. The personal computer could calculate mean and median scores, assign grades, etc. With such a device, grading errors due to stray or light pencil marks, for example, associated with paper answer sheets would be eliminated. Additionally, special purpose and expensive test reading devices would be eliminated since the ubiquitous personal computer programmed to access the smart diskettes through its 3½" disk drive would be used.

From the above examples it should be apparent that the variety of uses for the present invention are limited only by the imagination of the application programmer. As memory with greater and grater capacity becomes available, the data and program storage capacity of the smart diskette expands accordingly. Likewise, as microprocessors with greater capabilities are developed, so too do the capabilities of the smart diskette expand.

As display technology advances, so too does the display capability of the PIU display. The present display technology, e.g., liquid crystal display (LCD), is sure to advance to more efficient and effective displays in response to consumer demand, and the present invention contemplates incorporation of new display technologies as they arise for the PIU display. Likewise, as keyboard standards change, the PIU's can be configured to incorporate such new keyboards.

What is claimed is:

1. A tansfer device for use in transferring data between an electronic data processing device having a diskette station including a read/write device normally used to read magnetic media and a removable card having a storage device for storing data, said transfer device comprising:

a frame having an exterior form designed to accommodate said removable card, and including an insertion port receiving the card, the exterior form of said frame being substantially the same as that of a diskette to allow insertion of said frame into a diskette station of an electronic data processing device;

a first interface included at least partially within said frame and operable to transfer data between said transfer device and said electronic data processing device through said read/write device in the diskette station of said electronic data processing device normally used to read magnetic media;

processing circuitry disposed within said frame and coupled to said first interface for controlling transfer of data from said card to said transfer device; and a second interface coupled to said processing circuitry and disposed within said frame for coupling data from said card for transfer of data from said card to said data transfer device.

2. The transfer device of claim 1, wherein said card includes a digital memory and further including a battery housed in said frame, said battery operable to supply current through said second interface to electronic components located on an electronic card.

3. The transfer device of claim 2, further including a data memory housed in said frame and coupled to said processing circuitry, said processing circuitry including a digital processor operable to communicate with said card through said second interface.

4. The transfer device of claim 2, wherein said electronic components located on said electronic card include a processor and associated memory.

5. The transfer device of claim 1, wherein said diskette station of an electronic data processing device is integral with the electronic data processing device.

6. The transfer device of claim 1, further including an electronic card.

7. The transfer device of claim 6, wherein said electronic card is a smart card.

8. The transfer device of claim 6, wherein said electronic card is a chip card.

9. The transfer device of claim 6, wherein said electronic card is adapted to store confidential information which may be accessed only upon receipt of a security code.

10. The transfer device of claim 1, wherein said frame includes an insertion port having a recess or receiving and surrounding at least most of the side periphery of said card.

11. The transfer device of claim 1, further including:

a data transfer device memory included within said frame and coupled to said data transfer device processing circuitry.

12. The transfer device of claim 1, wherein said card includes a storage device adapted to store confidential data which may be accessed only upon verification of an appropriate access code.

13. The transfer device of claim 1, wherein said first interface includes a magnetic interface and wherein said second interface includes a connector for making electrical contact with electrical contacts on said card.

14. A data transfer device for use in transferring data between an electronic data processor device having a floppy disk drive including a diskette station for receiving diskettes inserted therein, and a card having a memory for storing data, said data transfer device comprising:

a frame having an exterior form being substantially the same as a diskette such that the frame can be inserted into a diskette station of said electronic data processor, said frame including an insertion port having a recess for receiving and surrounding at least most of the side periphery of said card;

a card interface disposed within said frame for coupling data from said card for transfer of data from said card to said data transfer device;

a data link for receiving data from said card;

a data transfer device processor, coupled to said data link, for receiving data on said data link from said card;

a data transfer device memory, coupled to said data transfer device processor;

a battery for supplying power to at least one component on said data transfer device and to at least one component on said electronic card via said connector; and interface circuitry, coupled to said data transfer device processor, for transferring data between said data transfer device and said diskette station of said electronic data processor.

15. A data transfer device according to claim 14, wherein said interface circuitry is operable to receive data from the electronic data processor and couple said data to said data link for writing to said memory on said card.

16. The transfer device of claim 15, wherein said memory on said card is adapted to store confidential data which may be accessed only upon receipt of an appropriate access code.

17. The transfer device of claim 14, wherein said interface circuitry is operable to receive data from said memory on said card by way of said data link and to transfer the data received from said memory on said memory card to said diskette station of said electronic data processor.

18. A data transfer device for use in transferring data between a data carrying module and an electronic data processor device having a floppy disk drive including a diskette station for receiving diskettes inserted therein comprising:

a frame having an exterior form being substantially the same as a diskette such that the frame can be inserted into a diskette station of said electronic data processor;

a removable data carrying module, having a periphery which is substantially smaller in size than said frame;

said frame including an insertion port having a recess for receiving said removable data carrying module and surrounding at least most of the side periphery of said data carrying module;

an data carrying module interface on said frame for receiving data from said data carrying module;

a data link coupled to said interface on said frame for receiving data transferred from said removable data carrying module;

a data processor mounted on said frame and coupled to said data link for receiving data on said data link from said data carrying module;

a memory mounted on said frame and coupled to said data processor;

a battery mounted on said frame for supplying power to at least one component mounted on said frame; and interface circuitry mounted on said frame and coupled to said data processor mounted on said frame, for transferring data between said data carrying module and said diskette station of said electronic data processor.

19. A data transfer device according to claim 18, wherein the data carrying module includes a memory having a storage capacity of at least two megabytes.

20. A data transfer device according to claim 18, wherein the data carrying module includes processing circuitry.

21. A data transfer device according to claim 20, wherein said processing circuitry is a data processor.

* * * * *

UNITED STATES PATENT AND TRADEMARK OFFICE

CERTIFICATE OF CORRECTION

PATENT NO.   : 6,015,093
DATED        : January 18, 2000
INVENTOR(S)  : EISELE et al.

It is certified that error appears in the above-identified patent and that said letters patent is hereby corrected as shown below:

Front page, Section [75], change "Paul Barrett, Worcester Park, United Kingdom; Raymund Eisele, Idstein, Germany" to -- Raymund Eisele, Idstein, Germany; Axel Burkart, Schorndorf, Germany--.

Column 14, line 46, change "tansfer" to --transfer--.

Signed and Sealed this

Third Day of April, 2001

Attest:

NICHOLAS P. GODICI

Attesting Officer         Acting Director of the United States Patent and Trademark Office